UNITED STATES PATENT OFFICE.

WM. GAGE AND RICHD. B. FELTHOUSEN, OF BUFFALO, NEW YORK.

IMPROVEMENT IN DRY-SAND CORES.

Specification forming part of Letters Patent No. 18,964, dated December 29, 1857.

*To all whom it may concern:*

Be it known that we, WILLIAM GAGE and RICHARD B. FELTHOUSEN, of the city of Buffalo, in the county of Erie and State of New York, have invented or discovered a new and useful improvement in the preparation of flour to be used in the composition of dry-sand cores for foundry purposes; and we do hereby declare that the following is a full and exact description thereof.

The nature of our invention relates to the preparation of flour by boiling or cooking the same until it is changed into a starchy or viscous body, preparatory to its use in the composition of dry-sand cores.

To enable others skilled in the art to practice and use our invention, we will proceed to describe the same.

We take any convenient quantity of flour and put it into a vessel, and mix therewith a sufficient quantity of water to make it flow freely as a liquid, taking care that the flour and water shall be so well mixed that there shall be no lumps of dry flour remaining therein. We then place the vessel containing the mixture over a fire and boil the same until it is converted into a starchy, glutinous, or viscous substance and sufficiently dense and strong to bear up an egg. It is then fit for use, and may be mixed with sand in the proportion of one gallon of this viscous liquid to twelve gallons of sand, and the cores formed in the common way.

The advantages claimed by preparing flour according to our method over its use in the old way are:

First. It is cheaper—that is to say, one pound of flour prepared in this manner and the viscous liquid mixed with sand will make as much core material as three pounds of flour used dry or unprepared, according to the common method.

Second. It is safer—that is to say, there is less combustibility in the core and less gas and vapor formed when the melted metal comes in contact with the core. Consequently the metal is less liable to "blow," although the core will still need ventilation.

Third. The core will retain its size and shape more perfectly, and is not so liable to shrink or swell or crack. The core is also stronger and less liable to break.

What we have said of flour we design to apply to all cereal bodies containing starchy, viscous, or glutinous properties.

We are aware that flour in a dry or unprepared state has long been used in the composition of dry-sand cores. We therefore disclaim its application or use in this well-known way.

What we claim as our invention, and desire to secure by Letters Patent, is—

The application and use of the viscous substance (or paste) which we obtain from flour in the manner herein described, in admixture with sand, for the purpose of forming dry-sand cores, in the manner herein set forth.

WILLIAM GAGE.
RICHARD B. FELTHOUSEN.

Witnesses:
E. B. FORBUSH,
WILLIAM DAVIS.